US006925751B2

(12) United States Patent
Williams et al.

(10) Patent No.: US 6,925,751 B2
(45) Date of Patent: Aug. 9, 2005

(54) AUTOMATED PEST CONTROL DUST APPLICATOR DEVICE FOR REMOTE APPLICATIONS

(76) Inventors: Kenneth E. Williams, 24 Everitts Rd., Ringoes, NJ (US) 08551; Kevin E. Williams, 431 Bellwood Ave., Asbury, NJ (US) 08802

(*) Notice: Subject to any disclaimer, the term of this patent is extended or adjusted under 35 U.S.C. 154(b) by 0 days.

(21) Appl. No.: 10/692,153

(22) Filed: Oct. 22, 2003

(65) Prior Publication Data

US 2005/0086852 A1 Apr. 28, 2005

(51) Int. Cl.[7] .................. A01M 9/00

(52) U.S. Cl. .................. 43/132.1; 43/124; 47/1.41; 222/251; 222/637

(58) Field of Search .................. 43/124, 125, 129, 43/132.1, 900; 222/83.5, 251, 394, 399, 637; 239/650, 654; 47/1.41

(56) References Cited

U.S. PATENT DOCUMENTS

| | | | | | |
|---|---|---|---|---|---|
| 165,276 | A | * | 7/1875 | Van Patten | 239/654 |
| 758,817 | A | * | 5/1904 | Brown et al. | 43/900 |
| 772,454 | A | * | 10/1904 | Brandt | 43/900 |
| 803,661 | A | * | 11/1905 | Brandt | 43/900 |
| 1,863,584 | A | * | 6/1932 | Tracy | 43/129 |
| 2,564,058 | A | * | 8/1951 | Fletcher et al. | 239/654 |
| 2,652,810 | A | * | 9/1953 | Paul, Jr. | 239/654 |
| 2,802,302 | A | * | 8/1957 | Yost | 47/1.41 |
| 2,926,456 | A | * | 3/1960 | Biro | 239/654 |
| 3,281,019 | A | * | 10/1966 | Curry | 222/399 |
| 3,322,623 | A | * | 5/1967 | Doakley | 43/132.1 |
| 3,368,591 | A | * | 2/1968 | Zerbetto | 222/394 |
| 3,517,885 | A | * | 6/1970 | Blake | 47/1.41 |
| RE30,993 | E | | 7/1982 | Hopp | |
| 4,553,698 | A | | 11/1985 | Parker et al. | |
| 4,624,070 | A | * | 11/1986 | Query et al. | 43/132.1 |
| 4,648,202 | A | * | 3/1987 | Renth | 43/132.1 |
| 4,667,436 | A | * | 5/1987 | Benson | 43/132.1 |
| 4,953,792 | A | | 9/1990 | Evans | |
| 4,966,755 | A | * | 10/1990 | Smith | 43/125 |
| 5,050,338 | A | * | 9/1991 | Doakley et al. | 43/132.1 |

(Continued)

FOREIGN PATENT DOCUMENTS

| | | | | |
|---|---|---|---|---|
| AU | 2000-68092 | A1 | * | 5/2001 |
| AU | 99-12161 | A1 | * | 11/2002 |
| EP | 530824 | A1 | * | 3/1993 |
| JP | 6-238199 | A1 | * | 8/1994 |
| JP | 9-327259 | A1 | * | 12/1997 |
| JP | 10-276653 | A1 | * | 10/1998 |

*Primary Examiner*—Darren W. Ark
(74) *Attorney, Agent, or Firm*—Kenneth P. Glynn

(57) ABSTRACT

The present invention relates to an automated pest control dust applicator device for remote applications, such as bug or bee or hornet spraying in high areas, e.g., trees, overhangs, porch roofs, dormers, eaves, etc. Thus, the automated pest control dust applicator device includes: an elongated support pole having a predetermined length and having a distal end and a proximal end; a dust dispensing nozzle located proximate the distal end of the pole, and connected to a dust reservoir; a conduit and a compressor, with appropriate controls. The dust reservoir is located at the distal end of the elongated support pole. The dust reservoir has an air inlet connected to the conduit, and has an outlet connected to the dust dispensing nozzle for dispersion of the dust. The conduit extends from the dust reservoir a substantial distance in length along the elongated support pole and is connected at its lower end to an air compressor. The automated pest control dust applicator device compressor is a portable compressor, and typically includes a rechargeable power source.

20 Claims, 4 Drawing Sheets

U.S. PATENT DOCUMENTS

| | | | | | |
|---|---|---|---|---|---|
| 5,054,231 | A | * | 10/1991 | Witherspoon | 43/124 |
| 5,058,312 | A | * | 10/1991 | Jackson | 43/124 |
| 5,109,628 | A | * | 5/1992 | Ellefson | 43/124 |
| 5,148,627 | A | * | 9/1992 | Thomas | 43/125 |
| 5,205,067 | A | * | 4/1993 | Thomas | 43/125 |
| 5,349,778 | A | * | 9/1994 | Chu | 43/124 |
| 5,542,207 | A | * | 8/1996 | Morris, Sr. | 43/132.1 |
| 5,548,921 | A | * | 8/1996 | Kleisath | 43/124 |
| 5,768,907 | A | * | 6/1998 | Lee | 43/132.1 |
| 5,860,243 | A | * | 1/1999 | Stager | 43/124 |
| 6,003,787 | A | | 12/1999 | Fisher | |
| 6,205,702 | B1 | * | 3/2001 | Ammons | 43/132.1 |
| 6,247,265 | B1 | * | 6/2001 | Maze et al. | 43/124 |
| 6,581,326 | B1 | * | 6/2003 | Smith | 43/132.1 |
| 6,688,036 | B1 | * | 2/2004 | Gunn | 43/125 |
| 2002/0078621 | A1 | * | 6/2002 | Jones | 43/124 |
| 2003/0046859 | A1 | * | 3/2003 | Robinson, Jr. | 43/125 |

* cited by examiner

AUTOMATED PEST CONTROL DUST APPLICATOR DEVICE FOR REMOTE APPLICATIONS

BACKGROUND OF THE INVENTION

1. Field of the Invention

The present invention relates to pest control dusting, and more particularly to a device for dusting in remote areas using compressed air. Thus, the present invention device is a remote duster that advantageously permits a user to deliver pest control powder (referred to as "dust" in the pest control industry) at an elevated location via a nozzle at a remote end of an extension pole with a portable compressor to cyclone and blow the dust at the desired location to exterminate pests such as bees, hornets or other pests. The compressor may be attached to the pole via an air line, and may be hand held or shoulder-mounted, and may be battery operated. In the present invention device, while the compressor is conveniently located at or near the lower end of the pole, the dust is stored in a container or preferably clear, graduated storage reservoir located at the far (distal) end of the pole. This eliminates air line clogging and permits controlled and measured application of the treatment, significant advantages over the prior art devices.

2. Information Disclosure Statement

The following prior art id representative of the state of the art in the field of pest control dusting devices:

U.S. Pat. No. 6,003,787 describes an insecticide spray apparatus for spraying insecticide in confined areas. The apparatus has a spray gun and a compressor assembly for providing compressed air through a flow line to the spray gun. A nozzle atomizes the insecticide for fogging operations and a trigger on the apray gun provides on and off control of the spray action. The compressor assembly has a base with a handle such that the compressor assembly can be carried in one hand by the user. A plurality of bottle holders are provided on the base for carrying spare pesticide containers.

U.S. Pat. No. 5,768,907 describes a sanitary pest control system that includes a housing with an air conditioning dsiposed within a hollow interior of the housing. The air conditioning system has a power cord extending outwardly form the housing for coupling with an electric outlet. A power switch is disposed within a top wall of the housing. The power switch is electrically coupled with the air conditioning system for selective activation or deactivation thereof. A temperature control panel is disposed within a forward wall of the housing and operatively coupled with the power switch and the air conditioning system to adjust air temperature. An air release nozzle couples with respect to the housing and is in communication with the air conditioning system.

U.S. Pat. No. 4,953,792 describes a dry pesticide applicator that includes a fluidizing medium secured within a housing. A blower mechanism generates a flow of air through the fluidizing medium to establish a fluidized bed within the housing. This fluidized bed is drawn into a dusting by means of a venturi to create a powdered stream. Whenever the dispensing mechanism is inoperative, the fluid flow which creates the powdered stream (by drawing the fluidized bed through a powder inlet) is directed into the housing through the powder inlet to purge any accumulation of powdered material therein.

U.S. Pat. No. 4,553,698 describes a pneumatic pesticide duster for use in the application of pesticide dusts in structures. The apparatus comprises a dust reservoir, compressed air source, manually operated control valve and metallic discharge tube having an opening ranging in size up to about ¾ inch capable of imparting an electrostatic charge to the expelled air/dust mixture such that dust is attracted to the walls of the structure and the areas to which the pesticide is confined can be closely controlled.

United States Pat. No. Re 30,993 describes a compression-type spray device employing a single nozzle that can be used to spray materials varying widely in density, composition and particle size. The device incorporates an air-and-material mix control using variably exposed slots in the nozzle to regulate the flow of high pressure air through the nozzle. A material supply control having variable restrictions may be provided in the material supply tube inlet to regulate the flow of material to the nozzle.

Notwithstanding the prior art, the present invention is neither taught nor rendered obvious thereby.

SUMMARY OF THE INVENTION

The present invention relates to an automated pest control dust applicator device for remote applications, such as bug or bee or hornet spraying in high areas, e.g., trees, overhangs, porch roofs, dormers, eaves, etc. Historically, ladders are used to reach high places with had held sprayers. Alternatively, high pressure sprayers are used from the ground, and these may be aerosol type sprayers, but are sometimes compressor-based sprayers. However, the compressor-based sprayers are bulky and usually require outlets, or are run by generators from vehicles. Most significantly, all of these compressor-based systems have had dust reservoirs at or near the compressor and/or user for easy filling, but these arrangements result in clogged lines and frequent cleaning requirements.

By its unique components and arrangements of components, the present invention provides a superior device that requires less maintenance and greater efficiencies than heretofore achieved. Thus, the present invention automated pest control dust applicator device includes: an elongated support pole having a predetermined length and having a distal end and a proximal end; a dust dispensing nozzle located proximate the distal end of the pole, and connected to a dust reservoir; a conduit and a compressor, with appropriate controls.

The dust reservoir is located at the distal end of the elongated support pole. By this is meant that it is mounted of otherwise connected to the end or near the end of the pole that would be the more distant from the user, i.e., at or near the top of the pole. The dust reservoir has an air inlet connected to the conduit, and has an outlet connected to the dust dispensing nozzle for dispersion of the dust.

The conduit may be tightly affixed to the pole, loosely affixed to it or merely hung from the reservoir. The conduit has an upper end and a lower end, and it is connected to the dust reservoir at the conduit upper end. The conduit extends from the dust reservoir a substantial distance in length along the elongated support pole and is connected at its lower end to an air compressor.

The air compressor is connected to the conduit at its lower end, such that, when the reservoir is loaded (e.g., half filled) with pest control dust, and the air compressor is activated, air travels up the conduit, into the reservoir, picks up pest control dust, and air with the pest control dust exits the dust dispensing nozzle for targeted, accurate dispensing of the dust. The automated pest control dust applicator device compressor is a portable compressor, and typically includes a rechargeable power source.

In some preferred embodiments of the present invention, the automated pest control dust applicator device for remote applications has a nozzle that is connected to a ported cap, and the ported cap is removeably connected to the dust reservoir to permit easy access and easy filling. The conduit may be a flexible hose of tube and may be connected to the air compressor via a quick release connector. Likewise, the conduit upper end may be connected to the dust reservoir via a quick release connector, and this is preferably located at a lower portion of the dust reservoir.

The automated pest control dust applicator device for remote applications may employ any workable reservoir, as long as it is upstream from the compressor and the conduit connecting the compressor to the reservoir. It is a critical feature of the present invention that the reservoir be located at or near the far or top end of the pole. The dust reservoir is preferably a transparent dust reservoir, and may be graduated, i.e. have markings on it to indicate powder level. It could be made of clear plastic, such as polyvinyl (polyvinyl chloride). The dust reservoir may be a threaded container at its top to permit easy access and refilling, as mentioned, and could be fabricated out of threaded piping, such as clear plastic tubing, with threads at the top and bottom, and with appropriate closures at each end, e.g., a threaded polyvinyl dust reservoir.

BRIEF DESCRIPTION OF THE DRAWINGS

The present invention should be more fully understood when the specification herein is taken in conjunction with the drawings appended hereto wherein.

DETAILED DESCRIPTION OF THE PRESENT INVENTION

Figure 1:
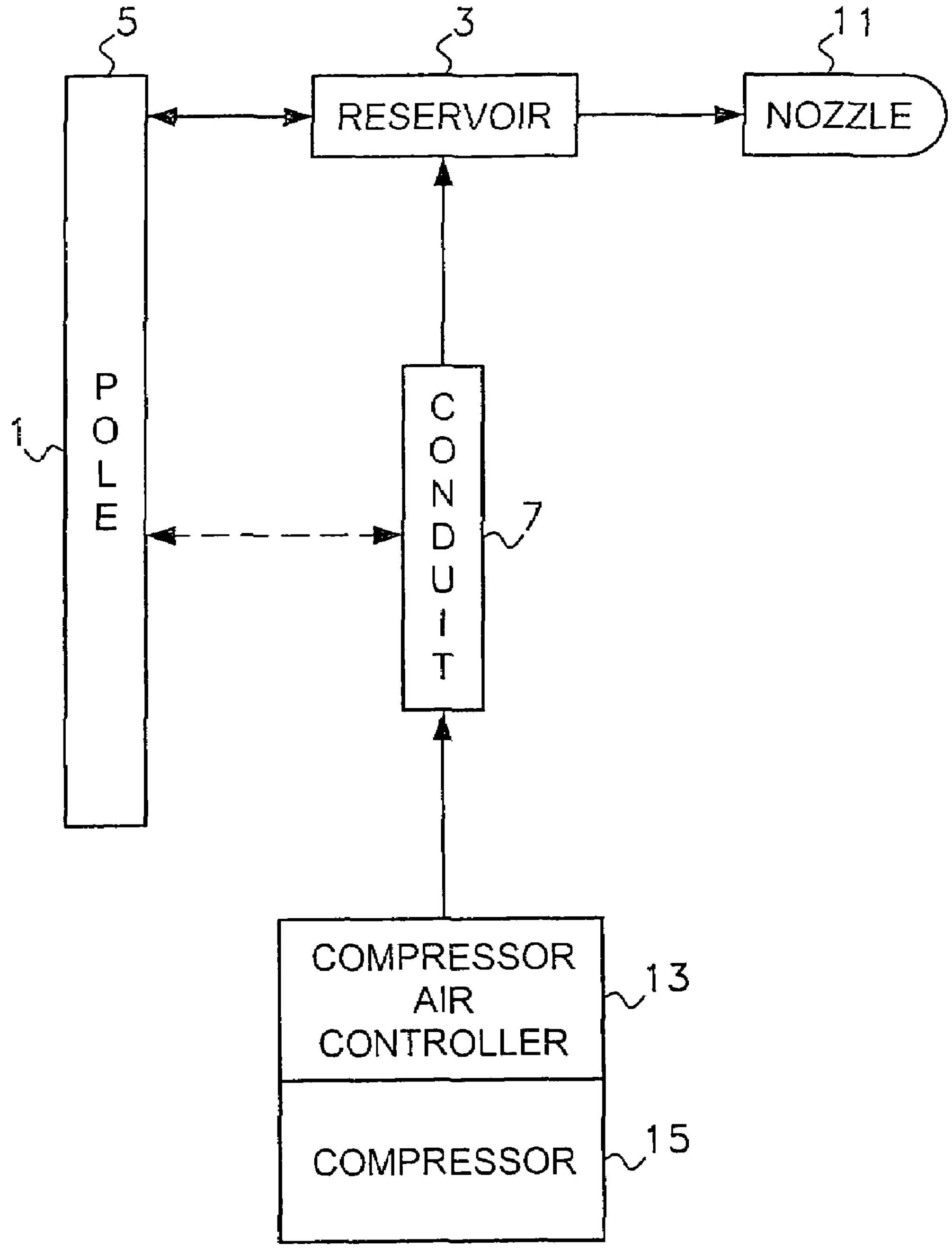
FIG. 1 illustrates a block diagram of the present invention pest control dust applicator device.

FIG. 1 illustrates a block diagram of the present invention pest control dust applicator device in accordance with the foregoing and following teachings. As shown, pole 1 has a reservoir 3 located at pole top 5. Reservoir 3 has an outlet to nozzle 11. Compressor 15, with compressor air controller 13, is connected via conduit 7 to reservoir 3. As described above, a user will add pest control dust, for example, drione dust or other available and well known powder, to reservoir 3. Subsequently, when the user is at a difficult (remote or high) area to make a dust application to eliminate pests, the user will turn on compressor 15 at an on/off switch (not shown), place the nozzle 11 in a desired area to be treated, and activate the compressor air controller 13 to give a short spray of dust. The pole may be of any predetermined length, and may be of light weight material. For example, the pole could be made of light plastic or aluminum, and be five to twelve feet in length. Alternatively, the pole 1 could be an extension pole, like a swimming pool vacuum or skimming net pole, that could extend from ten to sixteen feet.

Figure 2:
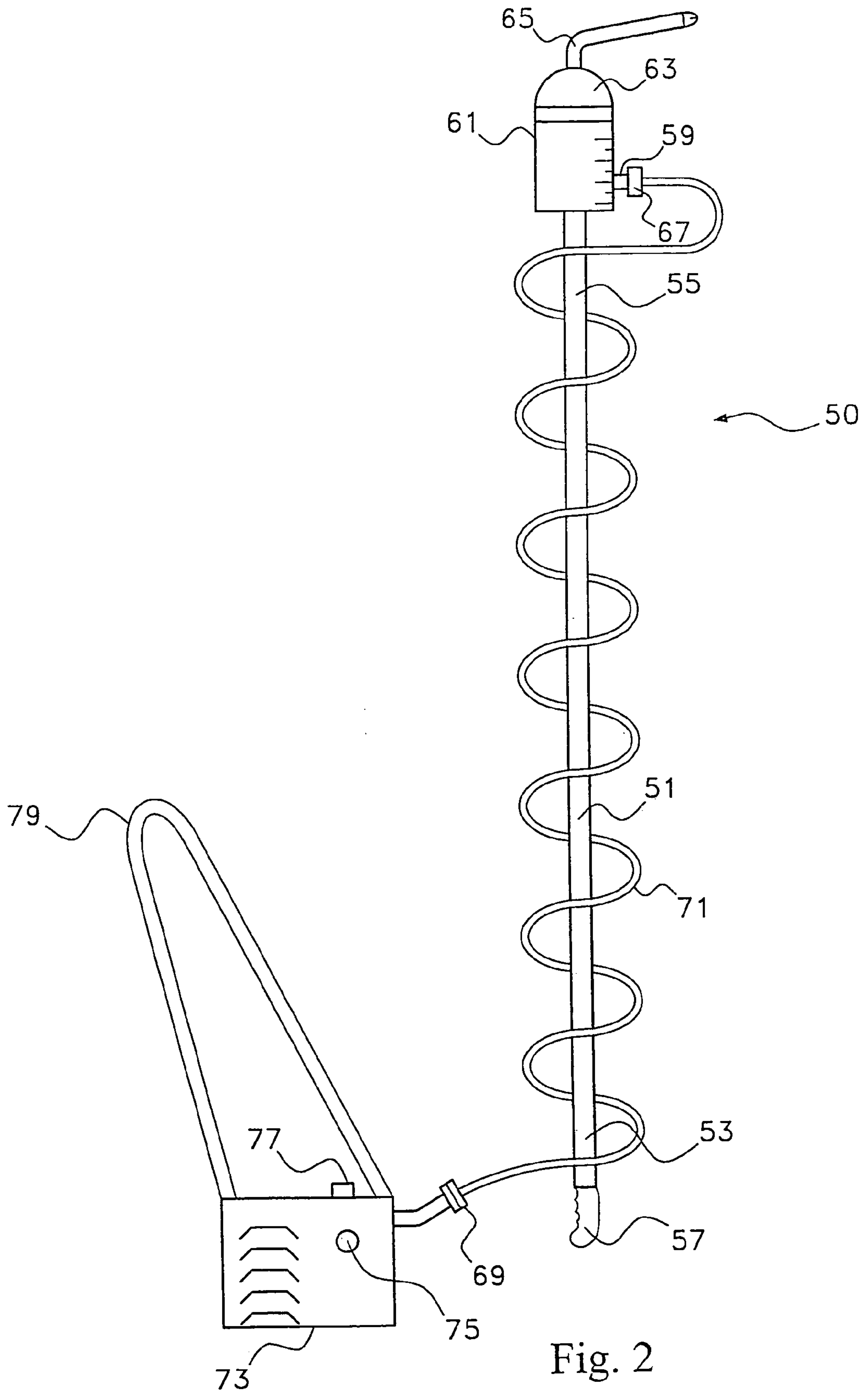
FIG. 2 shows a side view of one preferred embodiment of a present invention pest control dust applicator device.

FIG. 2 shows a side view of one preferred embodiment of a present invention pest control dust applicator device 50. Device 50 has a a support pole 51 with a bottom or proximal end 53, and a top or distal end 55. Proximal end has an optional handle 57, as shown. At the distal end 55 of pole 51 is a reservoir 61 that is permanently or removeably attached to end 55. The reservoir is preferrably made of clear plastic, although it could be made of glass or metal or other material without exceeding the scope of the present invention. Pest control dust reservoir 61 has a screw cap 63 with an outlet connected to nozzle 65. It also has an air inlet 59 with quick release connection 67 connected to coiled conduit 71. Conduit 71 may or may not be coiled and may or may not be directly attached to the pole 51, although if it is connected to pole 51, it would be more controllable than a free-floating conduit hanging from the reservoir. Reservoir 61 is not only preferred to be clear, but graduations are also advantageous to regulate the amount of dust deposited.

The conduit 71 is connected at its lower end with quick release connection 69 to battery operated, portable compressor 73. Compressor 73 has on/off switch 75 and air release button 77, as well as shoulder strap 79.

Figure 3:
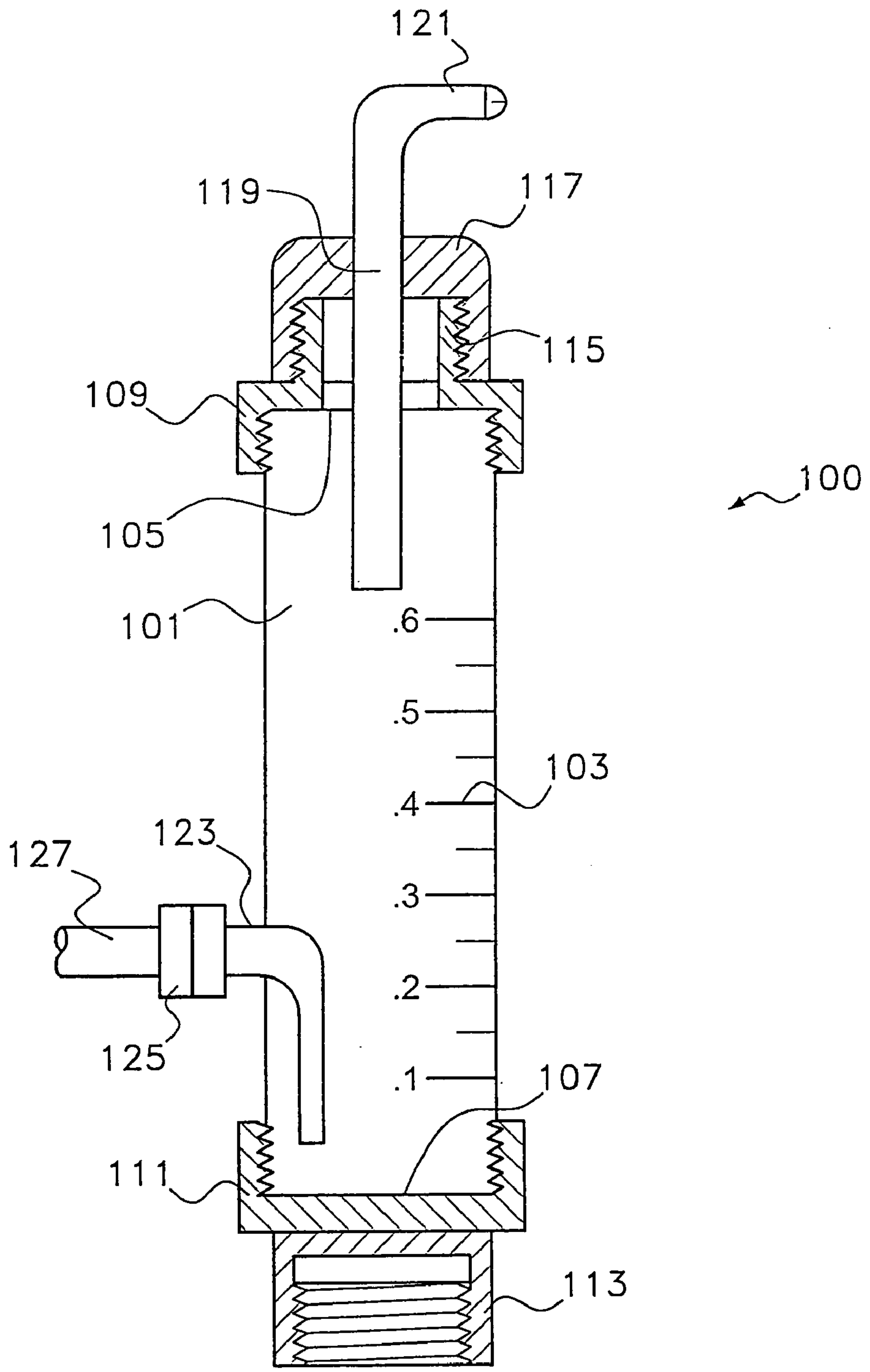
FIG. 3 shows details of one preferred embodiment of a reservoir utilized in a present invention device.

FIG. 3 shows details of one preferred embodiment of a reservoir 100 utilized in a present invention device. Reservoir 100 includes a clear polyvinyl chloride tube 101 that is threaded at its top 105 and bottom 107, and has graduated indicia 103. Bottom cap 111 is a closed cap and includes fitting 113 for attachment to a pole top. Conduit 127 is connected to brass fitting 123 via quick release connector 125, for inputting forced air into the reservoir. Top fitting 109 is an open fitting with an outlet. It is permanently (e.g. with glue) or removably screwed onto tube 101 and has a threaded male top component 115 for receiving threaded cap 117, with outlet 119 to nozzle 121, as shown.

Figure 4:
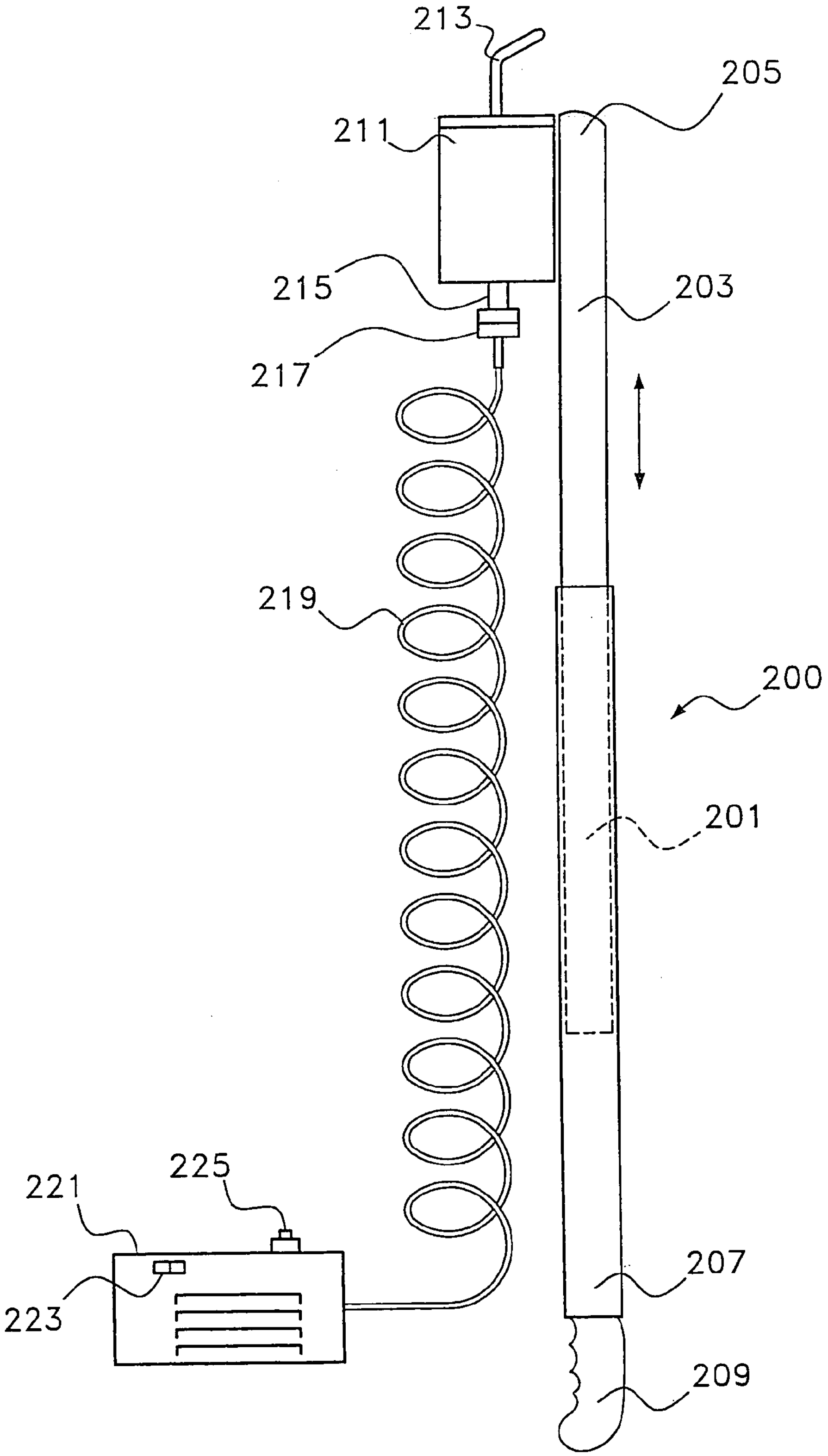
FIG. 4 illustrates another preferred embodiment of the present invention device with an telescoping extension support pole.

FIG. 4 illustrates another preferred embodiment of a present invention device 200 with an telescoping extension support pole. Here, the pole has a lower section 201 and an upper section 203 that are interconnected so that upper section 203 is slideably connected to telescope in and out of lower section 201, at pole distal end 205 is a pest control dust reservoir 211 with exit nozzle 213, as shown. Reservoir 211 has fill means (not shown) and an air inlet 215 that is connected to conduit 219 via quick release connector 217. Conduit 219 is connected at its lower end to battery operated, portable compressor 221. Compressor 221 has a compressor on/off switch 223, and an air release button 225, for instant, controlled firing of the device. The extension feature of the pole allows for height adjustment, and the device is otherwise used as device 50 described above.

Obviously, numerous modifications and variations of the present invention are possible in light of the above teachings. It is therefore understood that within the scope of the appended claims, the invention may be practiced otherwise than as specifically described herein.

What is claimed is:

1. An automated pest control dust applicator device for remote applications, which comprises:

(a) an elongated support pole having a predetermined length and having a distal end and a proximal end;

(b) a dust dispensing nozzle located proximate said distal end of said pole, and connected to a dust reservoir;

(c) said dust reservoir located at said distal end of said pole and having an outlet connected to said dust dispensing nozzle;

(d) a conduit having an upper end and a lower end, said conduit being connected to said dust reservoir at said conduit upper end, said conduit extending from said dust reservoir a substantial distance along said elongated support pole and being connected at said lower end to an air compressor; and (e) said air compressor being located separately from and not connected to said elongated support pole;

wherein, when said air compressor is activated, air travels up said conduit, into said reservoir, picks up pest control dust and air with the dust exits said dust dispensing nozzle.

2. The automated pest control dust applicator device for remote applications of claim 1 wherein said compressor is a portable compressor.

3. The automated pest control dust applicator device for remote applications of claim 2 wherein said portable compressor includes a rechargeable power source.

4. The automated pest control dust applicator device for remote applications of claim 1 wherein said nozzle is connected to a ported cap having said outlet, and said ported cap is removeably connected to said dust reservoir.

5. The automated pest control dust applicator device for remote applications of claim 1 wherein said conduit is connected to said air compressor via a quick release connector.

6. The automated pest control dust applicator device for remote applications of claim 1 wherein said dust reservoir is a transparent dust reservoir.

7. The automated pest control dust applicator device for remote applications of claim 6 wherein said transparent dust reservoir is a graduated transparent dust reservoir.

8. The automated pest control dust applicator device for remote applications of claim 1 wherein said conduit upper end is connected to said dust reservoir at a lower portion of said dust reservoir.

9. The automated pest control dust applicator device for remote applications of claim 1 wherein said conduit upper end includes a quick release connector at said reservoir.

10. The automated pest control dust applicator device for remote applications of claim 1 wherein said dust reservoir is a threaded polyvinyl dust reservoir.

11. An automated pest control dust applicator device for remote applications, which comprises:

(a) an elongated support pole having a predetermined length and having a distal end and a proximal end;

(b) a dust dispensing nozzle located proximate said distal end of said pole, and connected to a dust reservoir;

(c) said dust reservoir located at said distal end of said pole and having an outlet connected to said dust dispensing nozzle;

(d) a conduit having an upper end and a lower end, said conduit being connected to said dust reservoir at said conduit upper end, said conduit extending from said dust reservoir a substantial distance along said elongated support pole and being connected at said lower end to an air compressor; and (e) said air compressor being located separately from and not connected to said elongated support pole, said air compressor having a shoulder strap connected thereto;

wherein, when said air compressor is activated, air travels up said conduit, into said reservoir, picks up pest control dust and air with the dust exits said dust dispensing nozzle.

12. The automated pest control dust applicator device for remote applications of claim 11 wherein said compressor is a portable compressor.

13. The automated pest control dust applicator device for remote applications of claim 12 wherein said portable compressor includes a rechargeable power source.

14. The automated pest control dust applicator device for remote applications of claim 11 wherein said nozzle is connected to a ported cap having said outlet, and said ported cap is removeably connected to said dust reservoir.

15. The automated pest control dust applicator device for remote applications of claim 11 wherein said conduit is connected to said air compressor via a quick release connector.

16. The automated pest control dust applicator device for remote applications of claim 11 wherein said dust reservoir is a transparent dust reservoir.

17. The automated pest control dust applicator device for remote applications of claim 16 wherein said transparent dust reservoir is a graduated transparent dust reservoir.

18. The automated pest control dust applicator device for remote applications of claim 11 wherein said conduit upper end is connected to said dust reservoir at a lower portion of said dust reservoir.

19. The automated pest control dust applicator device for remote applications of claim 11 wherein said conduit upper end includes a quick release connector at said reservoir.

20. The automated pest control dust applicator device for remote applications of claim 11 wherein said dust reservoir is a threaded polyvinyl dust reservoir.

* * * * *